(12) United States Patent
Cheong et al.

(10) Patent No.: US 8,022,984 B2
(45) Date of Patent: Sep. 20, 2011

(54) SYSTEM AND METHOD FOR REDUCING JITTER DURING AN OPTICAL NAVIGATION OPERATION

(75) Inventors: Kai Yin Cheong, Penang (MY); Li Chong Tai, Penang (MY); Lean Lean Chong, Penang (MY); Bernard Lye Hock Chan, Penang (MY); Tong Sen Liew, Perak (MY); Shan Chong Tan, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1268 days.

(21) Appl. No.: 11/669,485

(22) Filed: Jan. 31, 2007

(65) Prior Publication Data

US 2008/0181526 A1 Jul. 31, 2008

(51) Int. Cl.
G06F 13/00 (2006.01)
(52) U.S. Cl. .............................. 348/94; 345/166; 710/73
(58) Field of Classification Search .................... 348/94; 345/166; 710/73
See application file for complete search history.

(56) References Cited

U.S. PATENT DOCUMENTS

| 6,983,080 | B2 | 1/2006 | Wenstrand et al. | |
| 7,019,116 | B2 * | 3/2006 | Desnoyers et al. | 530/351 |
| 7,889,178 | B2 * | 2/2011 | Chan et al. | 345/166 |
| 2002/0140677 | A1 * | 10/2002 | Misek et al. | 345/163 |

* cited by examiner

*Primary Examiner* — Viet Vu

(57) ABSTRACT

A system and method for reducing jitter during an optical navigation operation operates to automatically switch the current resolution based on jitter-resolution correlation data.

20 Claims, 4 Drawing Sheets

SYSTEM AND METHOD FOR REDUCING JITTER DURING AN OPTICAL NAVIGATION OPERATION

BACKGROUND OF THE INVENTION

Optical navigation systems operate to estimate movements between the optical navigation systems and target surfaces to perform tracking operations. An optical navigation system uses a light source, such as a light-emitting diode (LED) or a laser diode, to illuminate a region of a target surface and an image sensor to receive the light reflected from the target surface to successively capture frames of image data of the target surface. The optical navigation system compares the successive image frames and estimates the relative movements between the optical navigation system and the target surface based on the comparison between the current image frame and a previous image frame. The comparison is based on detecting and computing displacements of features in the captured frames of image data.

Optical navigation systems are commonly used in optical computer mice to track the movements of the mice relative to the surfaces on which the mice are manually manipulated. The movements of a computer mouse are used to control a cursor on a monitor of a computer system. The accuracy of an optical computer mouse with respect to the positioning of the cursor mostly depends on the resolution of the mouse. Higher resolution means that a user can more accurately position the cursor at specific locations on the monitor.

A concern with a conventional optical computer mouse is that tracking errors in the optical navigation system may cause jitter movements of the cursor being controlled by the optical computer mouse. These jitter movements can even occur when the optical computer mouse is stationary. Jitter movements are particular annoying to gamers since gamers manipulate the cursor for longer durations than other optical mouse users.

In view of this concern, there is need for a system and method for reducing jitter during an optical navigation operation.

SUMMARY OF THE INVENTION

A system and method for reducing jitter during an optical navigation operation operates to automatically switch the current resolution to a different resolution based on jitter-resolution correlation data. The jitter-resolution correlation data provides jitterness versus resolution information, which is used to select the new resolution to reduce jitter. Thus, the system and method can effectively reduce jitter to improve the performance of the optical navigation operation.

A system for reducing jitter during an optical navigation operation in accordance with an embodiment of the invention comprises an image sensor, a navigation engine and a resolution-switching module. The image sensor is configured to capture frames of image data of a target surface. The navigation engine is operably connected to the image sensor to receive the frames of image data. The navigation engine is configured to generate displacement values based on the frames of image data at a current resolution. The resolution-switching module is operably connected to the navigation engine. The resolution-switching module is configured to automatically switch the current resolution of the navigation engine to a different resolution using jitter-resolution correlation data in response to a jitter detection signal to reduce the jitter caused by the displacement values.

A method for reducing jitter during an optical navigation operation in accordance with an embodiment of the invention comprises capturing frames of image data of a target surface, generating displacement values at a current resolution based on the frames of image data, detecting the jitter caused by the displacement values, and automatically switching the current resolution to a different resolution using jitter-resolution correlation data to reduce the jitter.

Other aspects and advantages of the present invention will become apparent from the following detailed description, taken in conjunction with the accompanying drawings, illustrated by way of example of the principles of the invention.

DETAILED DESCRIPTION

Figure 1:
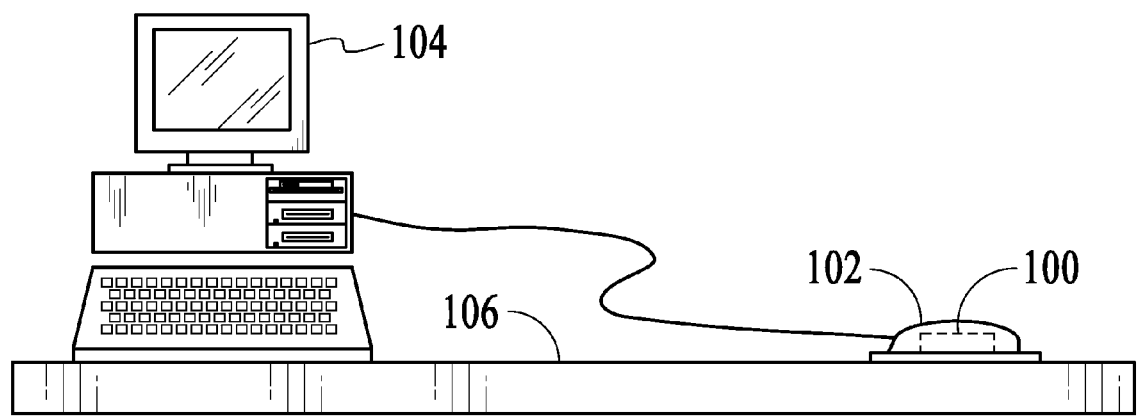
FIG. 1 shows an optical navigation system included in an optical computer mouse in accordance with an embodiment of the invention.

With reference to FIG. 1, an optical navigation system 100 in accordance with an embodiment of the invention is described. As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a target surface 106 by a user to control a cursor displayed on the computer 104. However, in other implementations, the optical navigation system 100 can be used in different products for various tracking applications. As described in detail below, the optical navigation system 100 is configured to automatically change the resolution of the system when jitter is detected in order to reduce the jitter. In particular, the change in resolution is based on a relationship between the degree of jitterness and resolution of the optical navigation system 100.

Figure 2:
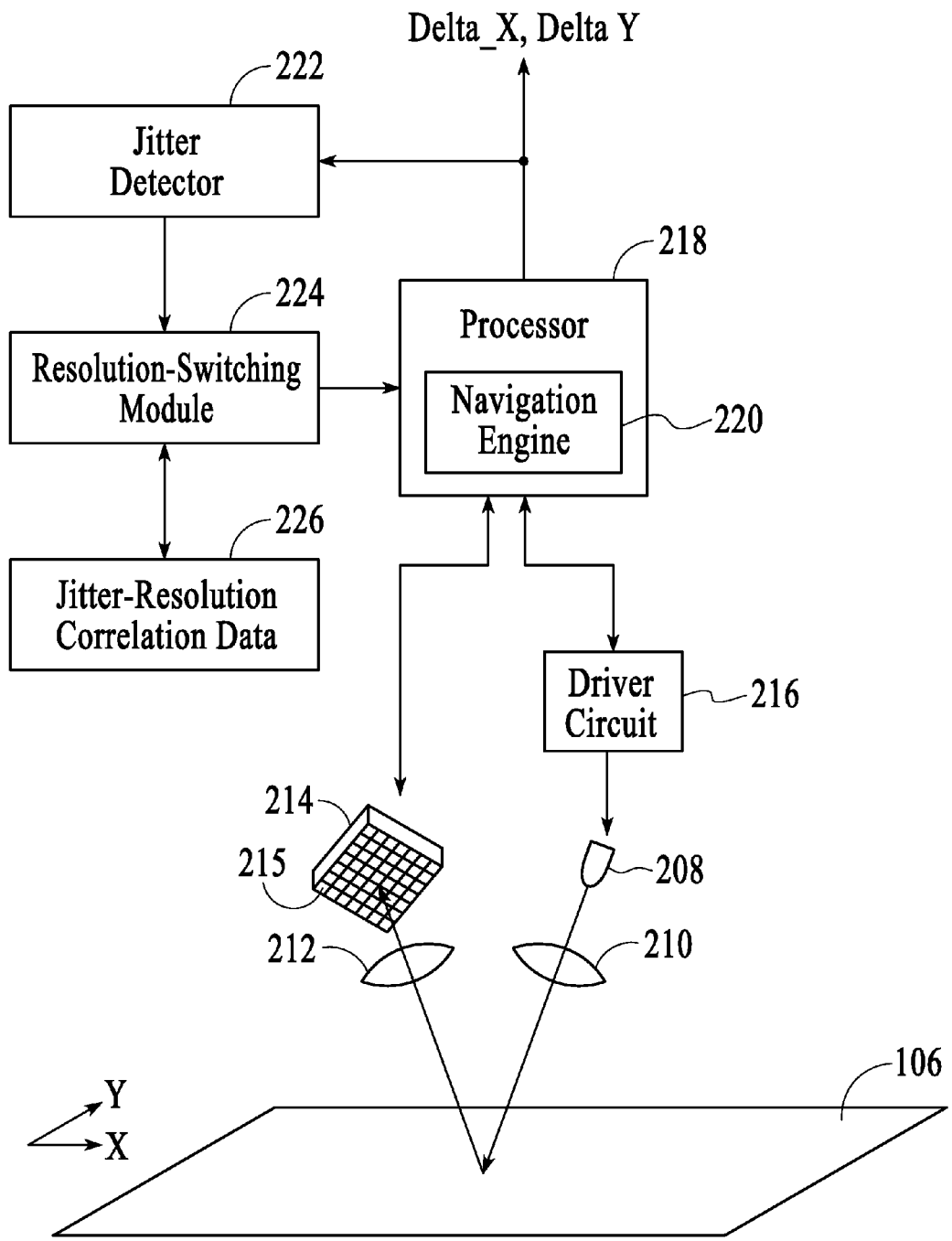
FIG. 2 is a diagram of the optical navigation system in accordance with an embodiment of the invention.

As shown in FIG. 2, the optical navigation system 100 includes a light source 208, a focusing lens 210, an imaging lens 212, an image sensor 214, a driver circuit 216, a processor 218 with a navigation engine 220, a jitter detector 222 and a resolution-switching module 224. Although these components of the optical navigation system 100 are shown in FIG. 2 as being separate components, some of these components may be integrated. As an example, the image sensor 214, the driver circuit 216 and the processor 218 with the navigation engine 220 may be integrated into a single integrated circuit chip. Furthermore, some of the components of the optical navigation system 100, such as the navigation engine 220, the jitter detector 222 and the resolution-switching module 224, may be implemented in any combination software, hardware and/or firmware.

The light source 208 is configured to generate light in response to an applied driving signal. The light source 208 can be any type of a light emitting device, such as a light-emitting diode or a laser diode. As an example, the light source may be a vertical-cavity surface-emitting laser (VCSEL), which generates coherent laser beam of light. The light source 208 is activated by the driver circuit 216, which provides driving signals to the light source. The focusing lens 210 is positioned between the light source 208 and the target surface 106 to focus the light from the light source onto a region of the target surface. The imaging lens 212 is positioned between the target surface 106 and the image sensor 214 to focus the light reflected off the target surface onto the image sensor.

The image sensor 214 is configured to capture frames of image data of the target surface 106 for motion estimation. The image sensor 214 includes photosensitive pixel elements 215 that generate image data in response to light incident on the elements. As an example, the image sensor 106 may be a charged-coupled device (CCD) image sensor or a complementary metal oxide semiconductor (CMOS) image sensor. The number of photosensitive pixel elements 215 included in the image sensor 214 may vary depending on at least the particular application of the optical navigation system 100. As an example, the image sensor 214 may include a 30×30 array of photosensitive pixel elements.

The processor 218 is configured to control the driver circuit 216 and the image sensor 214 in order to capture frames of image data of the target surface 106. The processor 218 is electrically connected to the driver circuit 216 and the image sensor 214 to provide control signals. The processor 218 provides control signals to the driver circuit 216 to direct the driver circuit to apply driving signals to the light source 208 to activate the light source. The processor 218 provides control signals to the image sensor 214 to accumulate electrical charges at the photosensitive pixel elements 215 and integrate at least some of the photosensitive pixel elements to produce each frame of image data of the target surface 106. Thus, the processor 218 is able to control the frame rate of the image sensor 214.

The processor 218 includes the navigation engine 220, which is programmed into the processor in this embodiment. In other embodiments, the navigation engine 220 may be a separate component. The navigation engine 220 operates to correlate frames of image data captured by the image sensor 214 to estimate displacement changes between the optical navigation system 100 and the target surface 106 with respect to X and Y directions. The process of correlating frames of image data for motion estimation or navigation is well known, and thus, is not described herein. The output of the navigation engine 220 includes directional delta X displacement values and directional delta Y displacement values at the current resolution. Each directional displacement value includes a negative or positive sign information, which indicates direction, and an absolute displacement value, which indicates the amount of displacement in that direction. In a particular implementation, the directional delta X and Y displacement values are generated in the form of hex numbers.

The jitter detector 222 is connected to the navigation engine 220 to receive the directional displacement values from the navigation engine. The jitter detector 222 is configured to automatically detect jitter using an algorithm by monitoring the directional displacement values produced by the navigation engine 220. Jitter is defined herein as movements of a cursor being controlled by the optical navigation system 100 that are random and non-corresponding to the actual movements of the optical navigation system. Thus, jitter can be detected by monitoring the directional displacement values from the navigation engine 220 and identifying the directional displacement values that are determined to be random and non-corresponding to the expected movements of the optical navigation system 100. In an embodiment, the jitter detector 222 is configured to count the number of detected jitter points during a predefined time period. A jitter point is defined by a pair of directional delta X and Y displacement values related to jitter. If the total number of jitter points exceeds a predefined threshold, the jitter detector 222 generates a jitter detection signal to indicate this condition of significant amount of jitter. In another embodiment, the jitter detector 222 is configured to derive a jitter index value using the total number of jitter points during the predefined time period, as described in more detail below. If the jitter index value exceeds a predefined threshold, the jitter detector 222 generates a jitter detection signal to indicate this condition.

In another embodiment, the jitter detection signal that indicates a significant amount of jitter may also be generated by the jitter detector 222 in response to a user input. In this embodiment, the user manually indicates that there is a significant amount of jitter using an input device, such as a key on the keyboard of the computer 104 or a button on the optical computer mouse 102.

The resolution-switching module 224 is connected to the jitter detector 222 to receive the jitter detection signal from the jitter detector 222. The resolution-switching module 224 is configured to automatically switch the current resolution of the optical navigation system 100 to a different resolution in response to the jitter detection signal from the jitter detector 222. The resolution of the optical navigation system 100 will sometimes be referred to herein as the optical navigation resolution.

The resolution-switching module 224 uses a correlation between the degree of jitteriness and the optical navigation resolution to switch the current resolution to a different optical navigation resolution to reduce the amount of jitter caused by the optical navigation system 100. This jitter-resolution correlation can be empirically derived. In an embodiment, the degree of jitteriness for a particular resolution is quantified as a jitter index value, which is derived using the following equation:

$$\text{Jitter Index Value (dpi)} = A/B * 100\%,$$

where A is the number of detected jitter points at a particular dpi over a fixed time period and B is the maximum number of detected jitter points across all dpi's being used to derive the jitter-resolution correlation. As an example, the jitter-resolution correlation can be derived by counting the detected jitter points at different resolutions over the fixed time period while the optical navigation system 100 remains stationary. A jitter point is a location defined by the output displacement values from the navigation engine 220 that does not correspond to the expected location, which in the above example is a fixed location.

The jitter-resolution correlation may include a measured jitter index value for each resolution setting of the navigation engine 220. As an example, if the navigation engine 220 has resolution settings of 200 dpi, 400 dpi, 600 dpi, 800 dpi, 1000 dpi, 1200 dpi, 1400 dpi, 1600 dpi 1800, 2000 dpi and 2200 dpi, then the jitter-resolution correlation may include a measured jitter index value for each of these resolution settings. Alternatively, some of the jitter index values may be extracted using the measured jitter index values. As an example, if only the jitter index values at 200 dpi, 600 dpi, 1000 dpi, 1400 dpi, 1800 dpi and 2200 dpi are measured, then the jitter index values at 400 dpi, 800 dpi, 1600 dpi and 2000 dpi can be interpolated from the measured jitter index values using, for example, linear interpolation or averaging.

The jitter-resolution correlation is stored in the optical navigation system 100 as data 226 and used by the resolution-switching module 224 to switch the current resolution of the navigation engine 220 to an appropriate resolution in response to a jitter detection signal from the jitter detector 222 to reduce jitter. In an embodiment, the resolution-switching module 224 is configured to automatically switch the current resolution of the navigation engine 220 to a resolution with the lowest jitter index value in the jitter-resolution correlation data 226 when a jitter detection signal from the jitter detector 222 is received. As an example, if the resolution of 600 dpi has the lowest jitter index value, then the resolution-switching module 224 will automatically switch the current resolution of the navigation engine 220 to the resolution of 600 dpi when a jitter detection signal from the jitter detector 222 is received regardless of the current resolution. In another embodiment, the resolution-switching module 224 is configured to automatically switch the current resolution of the navigation engine 220 to an adjacent lower or higher resolution, whichever has the lower jitter index value in the jitter-resolution correlation data 226 when a jitter detection signal from the jitter detector 222 is received. As an example, if the resolution of the navigation engine 220 is currently set to the resolution of 600 dpi, then the resolution-switching module 224 will automatically switch the resolution of the navigation engine 220 to either 400 dpi or 800 dpi, whichever has the lower jitter index, when a jitter detection signal from the jitter detector 222 is received. In another embodiment, the resolution-switching module 224 is configured to automatically switch the current resolution of the navigation engine 220 to a resolution within a predefined range of resolutions about the current resolution with the lowest jitter index value in the jitter-resolution correlation data 226 for that predefined range when a jitter detection signal from the jitter detector 222 is received.

In an implementation, the resolution-switching module 222 is able to switch the current resolution of the navigation engine 220 to a new resolution by writing specific resolution-setting data into a register (not shown) of the processor 218 associated with the navigation engine. In this implementation, the resolution-setting data written into that register sets the resolution of the navigation engine 220 with respect to the output displacement values to a particular resolution that corresponds to the written resolution-setting data.

Figure 3:
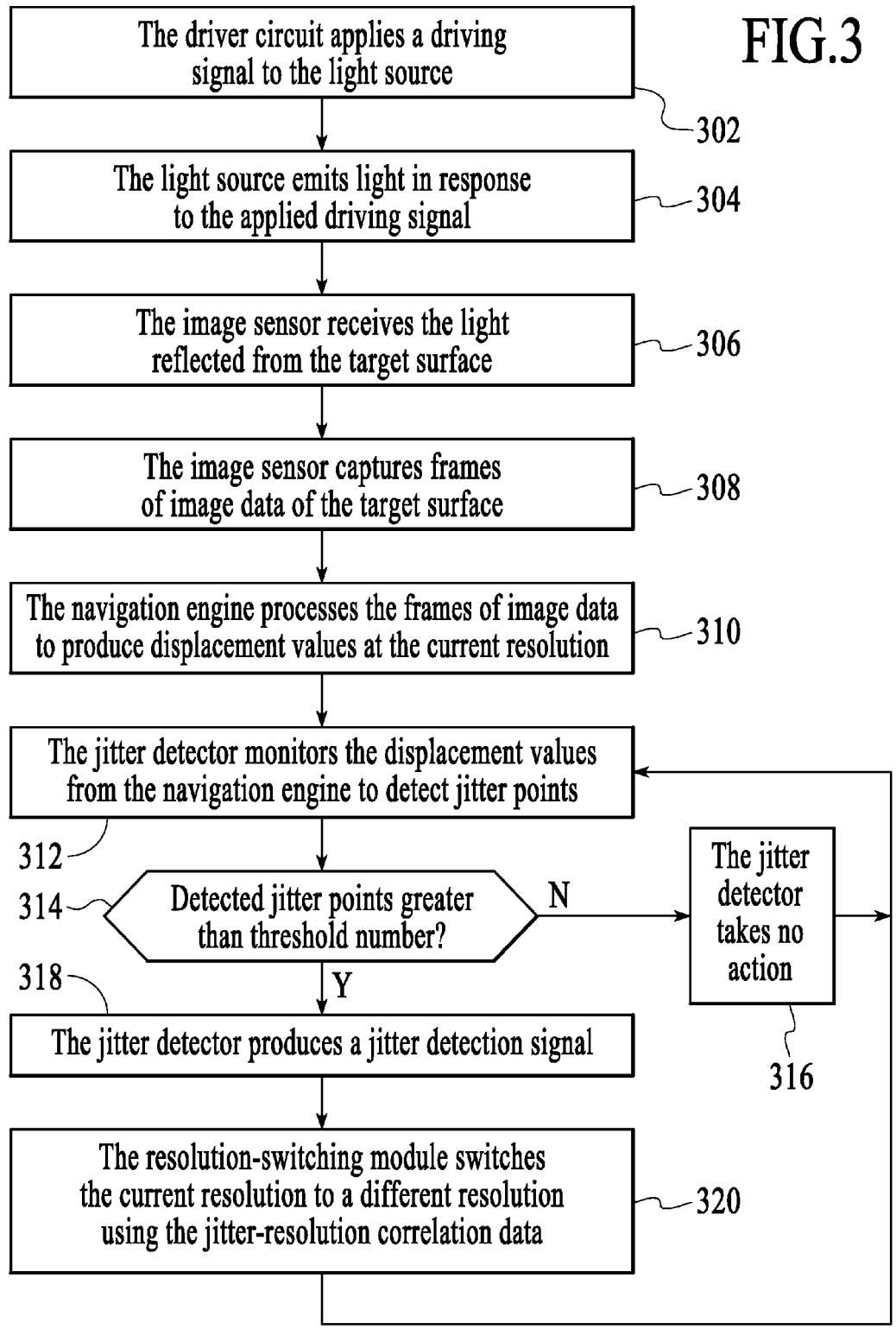
FIG. 3 is a process flow diagram of the operation of the optical navigation system in accordance with an embodiment of the invention.

The operation of the optical navigation system 100 in accordance with an embodiment of the invention is now described with reference to a process flow diagram of FIG. 3. At block 302, the driver circuit 216 applies a driving signal to the light source 208. Next, at block 304, the light source 208 emits light in response to the applied driving signal. Next, at block 306, the image sensor 214 receives the light reflected from the target surface 106. Next, at block 308, the image sensor 214 captures frames of image data of the target surface 106. Next, at block 310, the navigation engine 220 processes the frames of image data to produce displacement values at the current resolution.

Next, at block 312, the jitter detector 222 monitors the displacement values from the navigation engine 220 to detect jitter points. Next, at block 314, the jitter detector 222 makes a determination whether the number of detected jitter points during a predefined time period exceeds a threshold number. This determination can be made using the raw number of detected jitter points or a jitter index value derived using the number of detected jitter points. If the number of jitter points does not exceed the threshold number, then the operation proceeds to block 316, where the jitter detector 222 takes no action. The operation then proceeds back to block 312. However, if the number of jitter points does exceed the threshold number, then the operation proceeds to block 318, where the jitter detector 222 produces a jitter detection signal.

Next, at block 320, the resolution-switching module 224 switches the current resolution of the navigation engine 220 to a different resolution using the jitter-resolution correlation data to reduce jitter. In an implementation, the resolution-switching module 224 writes specific resolution-setting data into a register of the processor 220 to set the resolution of the navigation engine 220 to the new resolution. The operation then proceeds back to block 312 to continue monitoring displacement values from the navigation engine 220 to detect any new jitter points.

Figure 4:
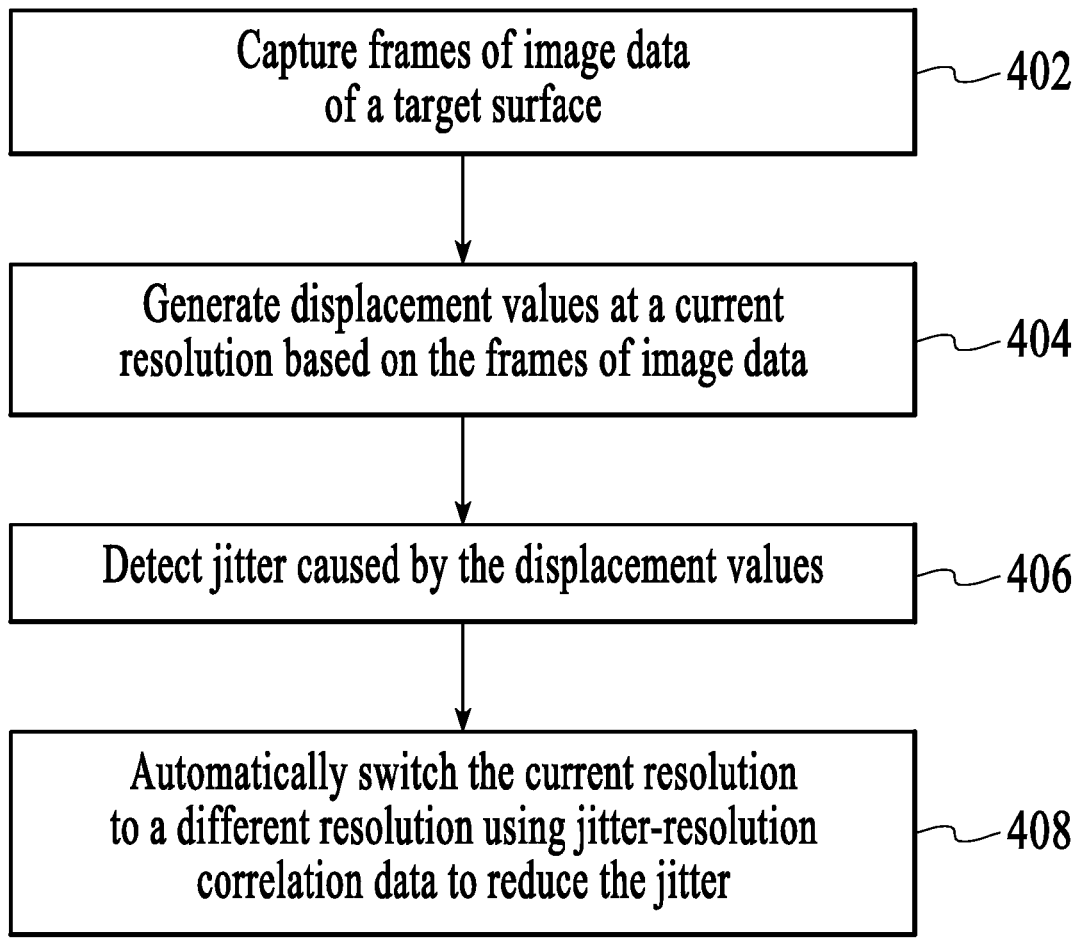
FIG. 4 is a process flow diagram of a method of reducing jitter during an optical navigation operation in accordance with an embodiment of the invention.

A method for reducing jitter during an optical navigation operation in accordance with an embodiment of the invention is described with reference to a process flow diagram of FIG. 4. At block 402, frames of image data of a target surface are captured. At block 404, displacement values are generated at a current resolution based on the frames of image data. At block 406, jitter caused by the displacement values is detected. At block 408, the current resolution is automatically switched to a different resolution using jitter-resolution correlation data to reduce the jitter.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for reducing jitter during an optical navigation operation comprising:
   an image sensor configured to capture frames of image data of a target surface;
   a navigation engine operably connected to said image sensor to receive said frames of image data, said navigation engine being configured to generate displacement values based on said frames of image data at a current resolution; and
   a resolution-switching module operably connected to said navigation engine, said resolution-switching module being configured to automatically switch said current resolution of said navigation engine to a different resolution using jitter-resolution correlation data in response to a jitter detection signal to reduce said jitter caused by said displacement values.

2. The system of claim 1 further comprising a jitter detector operably connected to said navigation engine to monitor said displacement values, said jitter detector being configured to detect said jitter using said displacement values to produce said jitter detection signal.

3. The system of claim 2 wherein said jitter-resolution correlation data includes jitter index values for different resolutions.

4. The system of claim 3 wherein said jitter detector is configured to compute a jitter index value for said current resolution from jitter points derived from said displacement values.

5. The system of claim 3 wherein said resolution-switching module is configured to switch said current resolution of said navigation engine to said different resolution with the lowest jitter index value in said jitter-resolution correlation data.

6. The system of claim 3 wherein said resolution-switching module is configured to switch said current resolution of said navigation engine to said different resolution within a predefined resolution range about said current resolution with the lowest jitter index value in said jitter-resolution correlation data for said predefined resolution range.

7. The system of claim 2 wherein said resolution-switching module is configured to write resolution-setting data into a register associated with said navigation engine to switch said current resolution of said navigation engine to said different resolution.

8. The system of claim 1 further comprising a driver circuit to provide a driving signal to a light source.

9. The system of claim 1 further comprising a light source to emit light onto said target surface.

10. The system of claim 9 wherein said light source include a light-emitting diode or a laser diode.

11. The system of claim 9 further comprising a lens positioned between said light source and said target surface.

12. The system of claim 1 further comprising an imaging lens positioned between said image sensor and said target surface.

13. A method for reducing jitter during an optical navigation operation, said method comprising:
   capturing frames of image data of a target surface;
   generating displacement values at a current resolution based on said frames of image data;
   detecting said jitter caused by said displacement values; and
   automatically switching said current resolution to a different resolution using jitter-resolution correlation data to reduce said jitter.

14. The method of claim 13 wherein said detecting includes automatically detecting said jitter caused by said displacement values using an algorithm.

15. The method of claim 14 wherein said jitter-resolution correlation data includes jitter index values for different resolutions.

16. The method of claim 15 wherein said automatically detecting includes computing a jitter index value from jitter points derived from said displacement values.

17. The method of claim 15 wherein said automatically switching includes switching said current resolution to said different resolution with the lowest jitter index value in said jitter-resolution correlation data.

18. The method of claim 15 wherein said automatically switching includes switching said current resolution to said different resolution within a predefined resolution range about said current resolution with the lowest jitter index value in said jitter-resolution correlation data for said predefined resolution range.

19. The system of claim 13 wherein said automatically switching includes writing resolution-setting data into a register associated with a navigation engine that generates said displacement values to switch said current resolution to said different resolution.

20. The method of claim 13 wherein said detecting includes manually detecting said jitter caused by said displacement values.

\* \* \* \* \*